United States Patent
Tamura et al.

(10) Patent No.: US 11,098,520 B2
(45) Date of Patent: Aug. 24, 2021

(54) DOOR OPENING/ CLOSING DEVICE FOR VEHICLE

(71) Applicant: HONDA ACCESS CORP., Niiza (JP)

(72) Inventors: Yasuhiro Tamura, Niiza (JP); Ryoichi Enoki, Niiza (JP); Shoji Yokoyama, Niiza (JP); Jun Sugimoto, Niiza (JP); Tatsuya Tachibana, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 154 days.

(21) Appl. No.: 16/499,446

(22) PCT Filed: Mar. 27, 2018

(86) PCT No.: PCT/JP2018/012449
§ 371 (c)(1),
(2) Date: Sep. 30, 2019

(87) PCT Pub. No.: WO2018/181322
PCT Pub. Date: Oct. 4, 2018

(65) Prior Publication Data
US 2020/0024886 A1    Jan. 23, 2020

(30) Foreign Application Priority Data

Mar. 31, 2017   (JP) .............................. JP2017-070125

(51) Int. Cl.
*E05F 15/73*        (2015.01)
*E05F 15/77*        (2015.01)
(Continued)

(52) U.S. Cl.
CPC ................. *E05F 15/73* (2015.01); *B60J 5/06* (2013.01); *B60R 25/24* (2013.01); *E05B 81/13* (2013.01);
(Continued)

(58) Field of Classification Search
CPC ....................................................... E05F 15/73
See application file for complete search history.

(56) References Cited

U.S. PATENT DOCUMENTS

| | | | |
|---|---|---|---|
| 7,489,050 B2 | 2/2009 | Matsuura et al. | |
| 7,688,179 B2 * | 3/2010 | Kurpinski | G07C 9/00309 340/5.72 |
| 2007/0132552 A1 | 6/2007 | Kurpinski et al. | |

FOREIGN PATENT DOCUMENTS

| | | |
|---|---|---|
| CN | 1523223 A | 8/2004 |
| JP | 2007-162459 A | 6/2007 |

(Continued)

OTHER PUBLICATIONS

Office Action dated Nov. 24, 2020, issued in counterpart CN Application No. 201880023141.1, with partial English translation (8 pages).
(Continued)

*Primary Examiner* — K. Wong
(74) *Attorney, Agent, or Firm* — Westerman, Hattori, Daniels & Adrian, LLP

(57) ABSTRACT

A door opening/closing device drives a slide door to a locked state under authentication communication between an authentication ECU of a vehicle side and a mobile device, when the slide door is in a closed and unlocked state and the presence of a user is detected by a detection unit.

3 Claims, 8 Drawing Sheets

(51) Int. Cl.
    *B60J 5/06*         (2006.01)
    *B60R 25/24*       (2013.01)
    *E05B 81/12*       (2014.01)
    *E05B 81/78*       (2014.01)
    *E05B 83/40*       (2014.01)

(52) U.S. Cl.
    CPC ............. *E05B 81/78* (2013.01); *E05B 83/40* (2013.01); *E05F 15/77* (2015.01); *E05F 2015/763* (2015.01); *E05Y 2900/531* (2013.01)

(56) References Cited

FOREIGN PATENT DOCUMENTS

| | | |
|---|---|---|
| JP | 2010-203066 A | 9/2010 |
| JP | 2012-172367 A | 9/2012 |

OTHER PUBLICATIONS

International Search Report dated Jun. 5, 2018, issued in counterpart International Application No. PCT/JP2018/012449, with English Translation. (2 pages).

\* cited by examiner

DOOR OPENING/ CLOSING DEVICE FOR VEHICLE

TECHNICAL FIELD

The present invention relates to a vehicle door opening/closing apparatus (door opening/closing device for vehicle) including a non-contact sensing unit for, after sensing the presence of a user located near a door of the vehicle and switching this door of the vehicle from a locked state to an unlocked state, setting this door to an open state or the like, without requiring the user to use his or her hands.

BACKGROUND ART

As a sensing unit that senses the presence of a user standing near a door of a vehicle, Japanese Laid-Open Patent Publication No. 2007-162459, for example, proposes radiating a laser beam toward the ground from a laser beam transceiver attached directly below a rear door of the vehicle (see [0025] in Japanese Laid-Open Patent Publication No. 2007-162459).

Japanese Laid-Open Patent Publication No. 2007-162459 discloses a hands-free door opening/closing apparatus in which the laser beam radiated toward the ground is triggered by the user moving his or her foot to block the laser beam, and after the rear door in the closed state that is locked according to the authentication of an electronic key is switched from the locked state to the unlocked state, the rear door is in a state of being opened only a short distance (referred to as being partially open) (see [0025], [0055], and FIG. 9 in Japanese Laid-Open Patent Publication No. 2007-162459).

SUMMARY OF INVENTION

However, in Japanese Laid-Open Patent Publication No. 2007-162459, there is no mention of technology by which after the user loads baggage into the backseat of the vehicle or the like when the rear door is in the open state, when the rear door is then closed, i.e. when the rear door is set to the closed and unlocked state, the user can set the door to the locked state when the user moves his or her foot to block the laser beam from outside the vehicle with the intention of locking the rear door.

In this case, i.e. in a case where the rear door is in the closed and unlocked state, when the user moves his or her foot to block the laser beam with the intention of setting the rear door to the locked state, there is a risk that the door may be opened instead (incorrectly).

In this way, even though the user has no intention of opening the door, i.e. the user is attempting to lock the door, the door is switched from the closed state to the open state, which causes discomfort and is in need of improvement.

The present invention has been devised in order to solve this type of problem, and has the object of providing a vehicle door opening/closing apparatus that us capable of not setting the door to the open state when the door is in the closed state and unlocked state and the presence of the user is sensed by the sensing unit.

The vehicle door opening/closing apparatus according to the present invention comprises a portable device configured to transmit a request signal to set a door of a vehicle to a locked state or an unlocked state, from outside the vehicle; a sensing unit provided to the vehicle and configured to sense, in a non-contact manner, presence of a user located near the door; an authentication unit provided on a side of the vehicle and configured to perform authentication communication with the portable device; and a door driving unit provided to the vehicle, and configured to drive the door to be in an open state or a closed state, and drive the door to be in the locked state or the unlocked state based on the authentication communication between the authentication unit and the portable device, wherein when the door is in the closed state and the unlocked state and the sensing unit senses the presence of the user, the door driving unit drives the door to be in the locked state based on the authentication communication between the authentication unit and the portable device, and when the door is in the locked state and the sensing unit senses the presence of the user, the door driving drives the door to be in the open state based on the authentication communication between the authentication unit and the portable device.

According to the present invention, when the door is in the closed state and the unlocked state and the sensing unit senses the presence of the user, the door is driven to be in the locked state, based on the authentication communication between the authentication unit and the portable device, and therefore it is possible to lock the door when there is intent of wanting to lock the door and no intent to open the door, thereby eliminating a feeling of discomfort.

When the door is in the locked state and the sensing unit senses the presence of the user, the door is driven to be in the open state (fully open or partially open), based on the authentication communication between the authentication unit and the portable device, and therefore it is possible to reliably set the door to the open state when there is intent to open the door that is in the locked state.

In the vehicle door opening/closing apparatus, it is preferable that the door driving unit includes an outer door handle switch configured to output an outer door handle switch ON signal when the user pulls an outer door handle, the sensing unit includes a separate outer door handle switch configured to output a pseudo outer door handle switch ON signal that is equivalent to the outer door handle switch ON signal output by the outer door handle switch, and when the door is in the locked state and the sensing unit senses the presence of the user, the door driving unit drives the door to be in the open state based on the authentication communication between the authentication unit and the portable device, with the pseudo outer door handle switch ON signal as a trigger, the pseudo outer door handle switch ON signal being output from the separate outer door handle switch of the sensing unit.

According to such a configuration, even if the sensing unit is a so-called retrofit option, it is possible to link the existing door driving unit with the portable device and drive the door to be in the open state, based on the authentication communication.

Furthermore, in vehicle door opening/closing apparatus, it is preferable that the door driving unit includes a door lock/unlock button configured to output a door lock trigger signal when pressed by the user, the sensing unit includes a generating section configured to generate and output a pseudo door lock trigger signal that is equivalent to the door lock trigger signal output by the door lock/unlock button, and when the door is in the open state, or in the closed state and the unlocked state and the sensing unit senses the presence of the user, the door driving unit drives the door to be in the locked state based on the authentication communication between the authentication unit and the portable device, with the pseudo door lock trigger signal as a trigger, the pseudo door lock trigger signal being output from the generating section of the sensing unit.

According to such a configuration, even if the sensing unit is a so-called retrofit option, it is possible to link the existing door driving unit with the portable device and drive the door to be in the locked state, based on the authentication communication.

Furthermore, in the vehicle door opening/closing apparatus, it is preferable that the door is a rear sliding door, the sensing unit includes an ultrasonic sensor configured to sense a foot of the user, and the ultrasonic sensor is arranged under a side sill of a front door.

According to this configuration, while work such as loading and unloading items is being performed with the rear sliding door in the open state, for example, it is possible to prevent the rear sliding door from unexpectedly closing due to the movement of the foot of the user who is doing this work.

The sensing unit according to the present invention is used in the vehicle door opening/closing apparatus described above.

According to the present invention, when the door is in the closed state and the unlocked state and the sensing unit senses the presence of the user, the door is driven to be in the locked state, based on the authentication communication between the authentication unit and the portable device, and therefore it is possible to lock the door when there is intent of wanting to lock the door and no intent to open the door, thereby eliminating a feeling of discomfort.

When the door is in the locked state and the sensing unit senses the presence of the user, the door is driven to be in the open state (fully open or partially open), based on the authentication communication between the authentication unit and the portable device, and therefore it is possible to reliably set the door to the open state when there is intent to open the door that is in the locked state.

According to the present invention, when the door is in the closed state and the unlocked state and the sensing unit senses the presence of the user, the door is driven to be in the locked state, based on the authentication communication between the authentication unit and the portable device, and therefore it is possible to lock the door when there is intent of wanting to lock the door and no intent to open the door, thereby eliminating a feeling of discomfort.

When the door is in the locked state and the sensing unit senses the presence of the user, the door is driven to be in the open state (fully open or partially open), based on the authentication communication between the authentication unit and the portable device, and therefore it is possible to reliably set the door to the open state when there is intent to open the door that is in the locked state.

Even if the sensing unit is a so-called retrofit option, it is possible to link the existing door driving unit with the portable device and drive the door to be in the open state, based on the authentication communication.

The object, features, and advantages described above will be easily understood from the following description of the embodiment, which references the attached drawings.

DESCRIPTION OF EMBODIMENTS

The following provides a detailed description of preferred embodiments of a vehicle door opening/closing apparatus according to the present invention, while referencing the accompanying drawings.

Configuration

Figure 1:
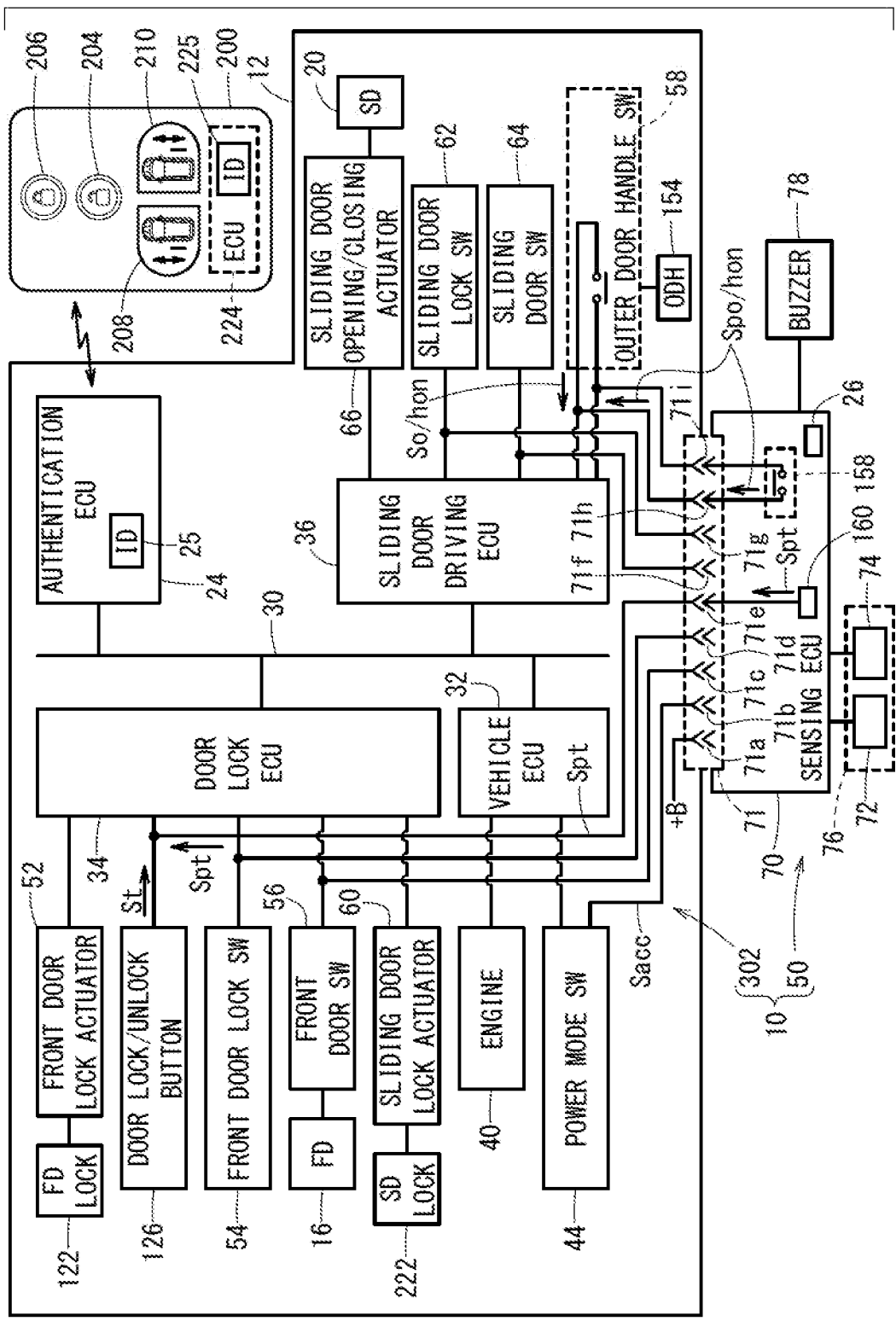
FIG. 1 is a schematic block diagram of a vehicle door opening/closing apparatus according to an embodiment.

FIG. 1 is a schematic block diagram of a vehicle door opening/closing apparatus 10 according to the present embodiment.

Figure 2A:
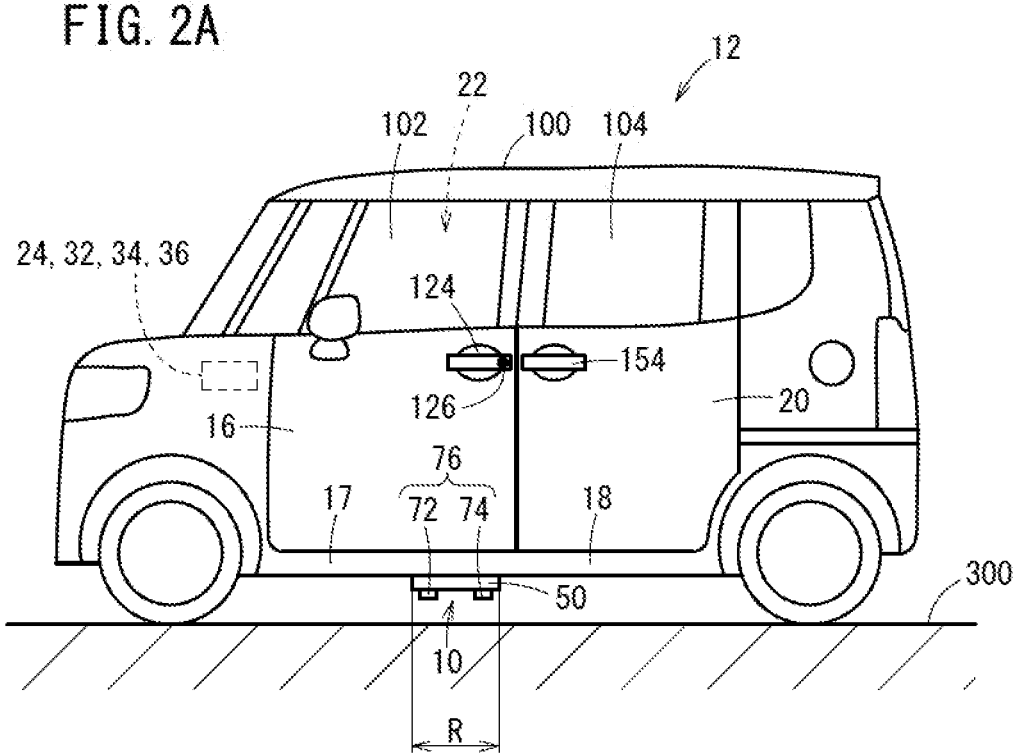
FIG. 2A is a schematic side view of a state where a sliding door is closed.
Figure 2B:
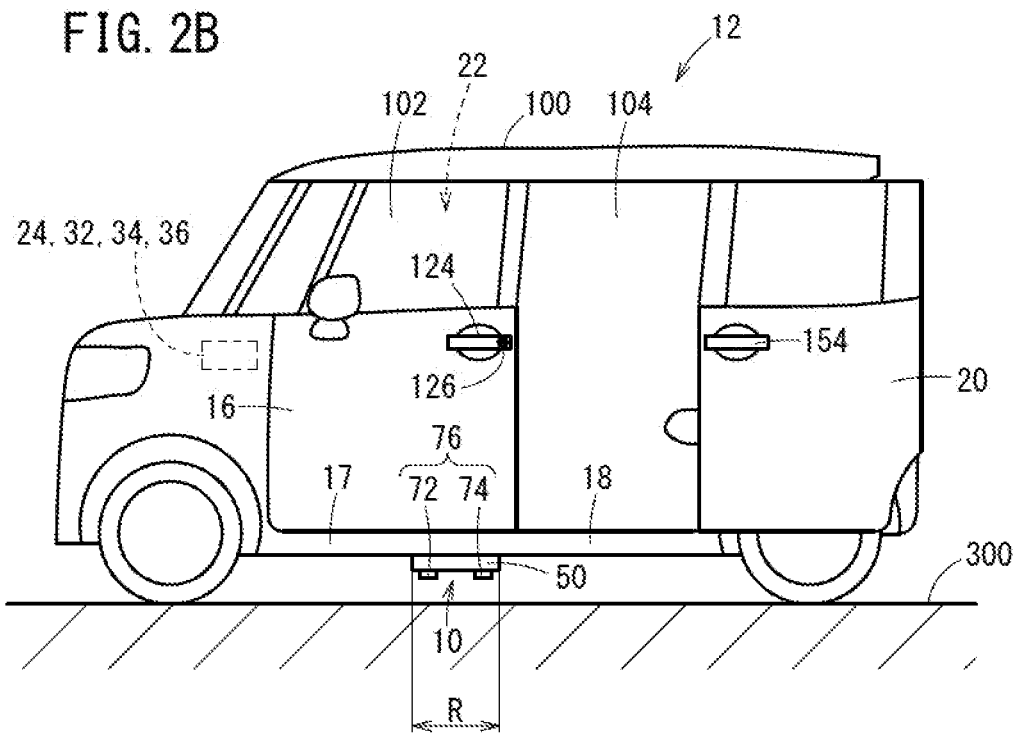
FIG. 2B is a schematic side view of a state where the sliding door is open.

FIG. 2A is a schematic side view of an example of a state in which a sliding door (rear sliding door) 20 on the rear passenger side of a vehicle 12 including a right-side handle is closed, and FIG. 2B is a schematic side view of a state in which the sliding door 20 of the vehicle 12 is open.

In order to avoid complication and facilitate understanding, in the present embodiment, the configuration and operation of the vehicle door opening/closing apparatus 10 are described using a front door 16 and the sliding door 20 on the passenger side of the vehicle 12 as examples, but since the front door and sliding door on the driver side have the same configuration and operation as on the passenger side, these doors are also included in the invention.

As shown in FIG. 1, the vehicle door opening/closing apparatus 10 is basically formed from a vehicle door opening/closing apparatus body 302 inside the vehicle 12, a sensing unit 50 that can sense a user (person) in a non-contact manner, and a portable device 200 that can be carried by the user.

As shown in FIGS. 2A and 2B, the front door 16 of the vehicle 12 is a hinged door for manually opening and closing a front left open portion 102 of a vehicle body 100 by the user gripping a door handle 124 of the front door 16 (outer door handle of the front door 16).

On the other hand, the sliding door 20 of the vehicle 12 is a sliding type door with which a left rear open portion 104 of the vehicle body 100 is opened when an outer door handle (sometimes abbreviated below as ODH) 154 of the sliding door 20 is pulled by the user.

In actuality, the sliding door 20 is a so-called power sliding door that, on a condition that the sliding door 20 is in a closed state and unlocked state, automatically opens in a so-called motorized manner when the user pulls the outer door handle 154 of the sliding door 20 or when the user presses an opening/closing button (APS) 208 of the portable device 200 that forms a smart key type of entry system.

As described in detail further below, when the sliding door 20 according to the present invention is in the closed state and unlocked state, the sliding door 20 is controlled to not open even if the sensing unit 50 senses that the foot of the user has been pulled away.

As shown in FIG. 1, the smart key type of entry system includes an authentication ECU (Electronic Control Unit) (authentication control section, authentication unit) 24, which is an on-board device, and the portable device 200 that is carried by the user.

The authentication ECU 24 is a computing device including a microcomputer; includes a CPU (central processing unit), a storage device (storage section) 25 such as a ROM (including an EEPROM) and a RAM (Random Access Memory) serving as memory, a timer serving as a clock device (clock section), and, if necessary, an input/output apparatus or the like such as an A/D converter or D/A converter; and functions as various function realizing devices (function realizing section, function realizing means), e.g. a controller (control section), computer (computing section), processor (processing section), and the like by having the CPU read and execute programs recorded in the ROM.

Other ECUs in the description below have a similar configuration to the authentication ECU 24 described above.

The authentication ECU 24 further includes a transceiver circuit (not shown in the drawings) for performing wireless authentication communication with the portable device 200.

The portable device 200 includes an ECU (portable device ECU) 224, and this portable device ECU 224 also serves as an authentication ECU (authentication control section) of the portable device 200. An ID for mutual authentication of the portable device 200 is stored in a storage device 225 (EEPROM) of the portable device ECU 224, and an ID identical to this ID for mutual authentication is stored in advance in the storage device 25 (EEPROM) of the authentication ECU 24 of the vehicle 12.

The portable device 200 is provided with a manipulation portion formed from a lock release button (also referred to as an unlock button) 204 for the front door 16 and sliding door 20, a lock engage button (also referred to as a lock button) 206 for the front door 16 and sliding door 20, an opening/closing button 208 for the sliding door 20 (passenger side), and an opening/closing button 210 for the sliding door 20 (driver side), all of which appear on the portable device 200 and can be pressed by the user or the like. The portable device 200 is also provided with an indicator (not shown in the drawings) such as an LED that can be seen by the user or the like and a buzzer, speaker, or the like (not shown in the drawings) that can be heard by the user or the like.

The portable device ECU (also serving as an authentication ECU (authentication control section)) 224 described above including the transceiver circuit for performing wireless authentication communication with the on-board authentication ECU 24 is provided inside the portable device 200.

The unlock button 204, the lock button 206, and the opening/closing buttons 208, 210 are electrically connected to the portable device ECU 224.

With a smart key entry system, as is widely known, when the user carries the portable device 200 and approaches the front side of the front door 16 of the vehicle 12, the front door 16 of the vehicle 12 is set to an unlock standby mode or the sliding door 20 of the vehicle 12 is set to an unlock standby mode, without the user manipulating any buttons of the portable device 200.

In this unlock standby mode, in order to automatically unlock (release the lock of) the vehicle door (front door 16 or sliding door 20), the user simply holds the portable device 200 that is an automatic response device and walks into a prescribed wireless frequency communication range of the vehicle 12 (a below-described portable device sensing range 80 that is near the front side of the front door 16). As a result, the authentication ECU 24 and the portable device 200 perform authentication communication to determine whether the mutual IDs are the same.

After the authentication communication has ended successfully (the mutual IDs are the same), when the user presses a door lock/unlock button 126 (door lock sensor) provided on the door handle 124 of the front door 16, for example, a front door lock 122 and a lock (sliding door lock) 222 of the sliding door 20 are unlocked (released). After this, when the user pulls the door handle 124, the front door 16 opens.

On the other hand, by having the user pull the outer door handle (ODH) 154 when the sliding door 20 is in the unlocked state, or by having the user press the opening/closing button 208 of the portable device 200 when the sliding door 20 is in the locked state, the sliding door 20 can be automatically opened.

The vehicle door opening/closing apparatus 10 includes, in addition to the authentication ECU 24 described above, ECUs including a vehicle ECU 32 (vehicle control section), a door lock ECU 34 (door lock control section), and a sliding door drive ECU 36 (sliding door drive control section) that are connected to each other via an intra-vehicle communication line 30.

The sensing unit 50 of the vehicle door opening/closing apparatus 10 according to the present embodiment is not attached in the production plant line of the vehicle 12, and is instead commercially available and attached as an option that can be attached at a later stage (retrofit option) by a dealer or the like, but the sensing unit 50 may be attached in the production plant line.

As shown in FIG. 1, the sensing unit 50 includes an ultrasonic sensor 76 formed by one set of a transducer 72 and a transducer 74 having the same specifications, a buzzer 78, and a sensing ECU 70 (sensing control section).

Figure 3:
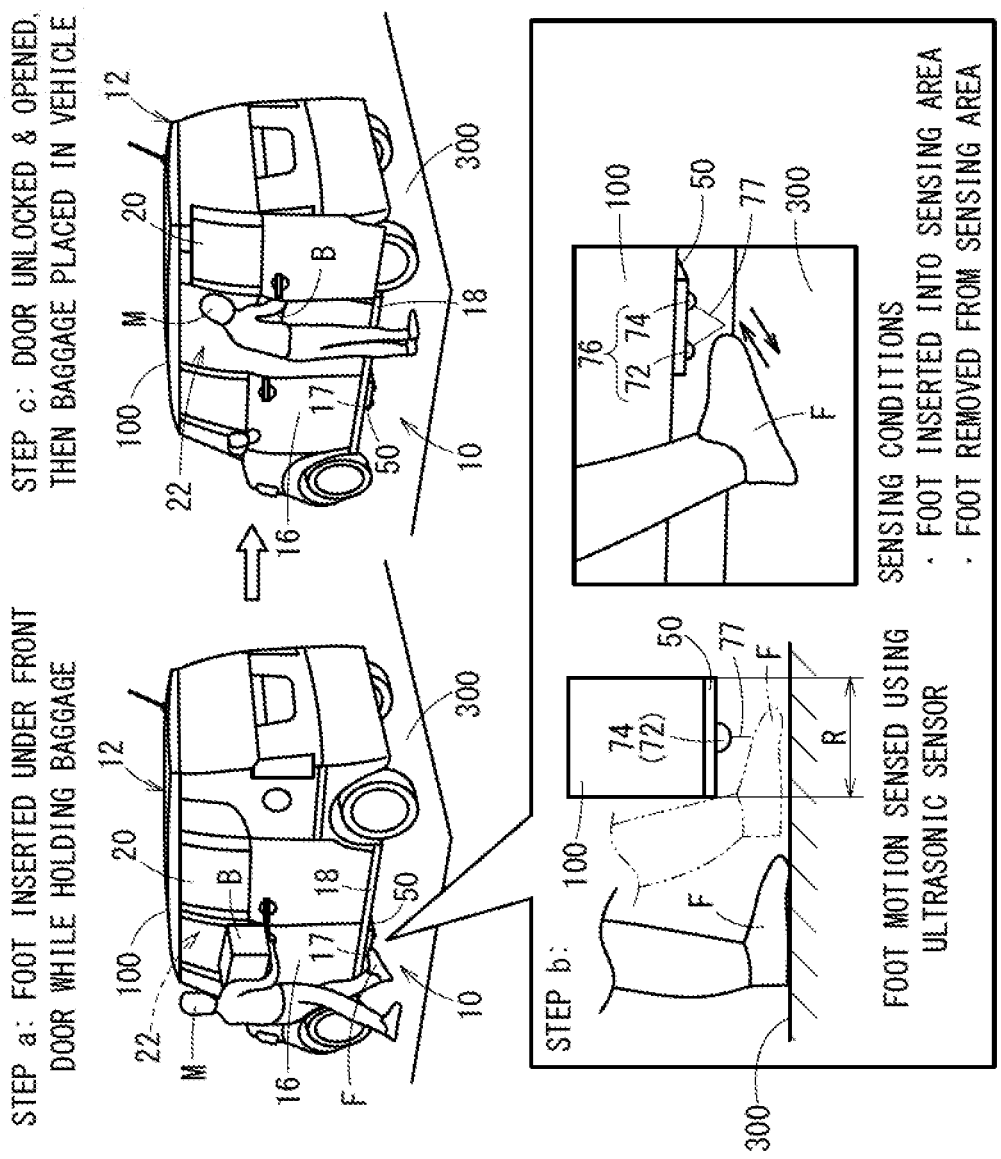
FIG. 3 is a descriptive diagram of a usage scenario imagined for a sensing unit.

As shown in FIGS. 2A, 2B, and 3, the transducer 72 and the transducer 74 are arranged along the longitudinal direction of the vehicle 12. The transducer 72 and the transducer 74 are each a transmission/reception dual-purpose type configured to alternately switch between transmission and reception of ultrasonic waves at a predetermined period (e.g. every several hundred milliseconds), and have an advantage in that the usable period thereof can be lengthened compared with when the transducer 72 and the transducer 74 are used only for transmission or reception. In the drawings, reference numeral R indicates a sensing range (sensing region) where the ultrasonic sensor 76 is capable of sensing.

The sensing unit 50 is electrically connected in a wired manner to the vehicle door opening/closing apparatus body 302 in the vehicle 12 via a connector 71, and as shown in FIGS. 2A and 2B, is secured inside the vehicle body 100 by a fastening member (not shown in the drawings) at a position below the front door 16 (under a front side sill 17) and near a region below the sliding door 20 (rear side sill 18), so as to easily sense the insertion and removal of a left foot F of a user M.

FIG. 3 is a descriptive diagram of a usage scenario imagined for the sensing unit 50. The detailed operation relating to the sensing unit 50 is described further below.

As an example, in a state where the front door 16 and the sliding door 20 of the vehicle 12 parked on a ground 300 are in the locked state, the user M, who is carrying the portable device 200 in a pocket or the like of his or her clothing and holding baggage B in both hands, places the left foot F below the ultrasonic sensor 76 (in the prescribed sensing range R) under the front door 16 (under the front side sill 17) (step a).

Next, the user M removes his or her left foot F within several seconds from below the ultrasonic sensor 76 (from the prescribed sensing range R between the ultrasonic sensor 76 and the ground 300). With the sensing of this left foot F insertion/removal action (referred to as a kicking action (kicking motion)) as a trigger, (the portable device ECU 224 of) the portable device 200 and the authentication ECU 24 start the authentication communication (step b).

In actuality, the sensing of this insertion/removal action of the left foot F or the like by the ultrasonic sensor 76 is performed by determining whether an ultrasonic wave 77 (transmission wave) transmitted from the transducer 72 and reflected from the ground 300 is instead temporarily reflected from the left foot F or the like and is then again reflected from the ground 300 within several seconds (within a prescribed time), by using the transducer 74 to monitor a state (return time) of the ultrasonic wave 77 (reflected wave).

When the authentication of step b above is successful, the front door 16 and the sliding door 20 are switched from the locked state to the unlocked state, and furthermore, the sliding door 20 is automatically opened.

The user M who has the baggage B occupying both hands can put the baggage B down into a vehicle cabin 22 and load this baggage B in the vehicle 12 (step c).

The user M, who has put the baggage B down into the vehicle cabin 22 and then determined that the loading of the baggage B has been completed, performs the kicking motion described above (with either the right foot or the left foot F) (step b again).

With the sensing of this kicking motion as a trigger, the sliding door 20 is automatically closed. After this, when (the portable device ECU 224 of) the portable device 200 and the authentication ECU 24 perform authentication communication and this authentication is successful, the sliding door 20 is set to the locked state. At this time, all other doors, including the front door 16, are set to the locked state.

In this case, since the sensing unit 50 (ultrasonic sensor 76) is provided under the front door 16 (under the front side sill 17), even if the foot (left foot F or right foot) of the user M is inserted under the rear side sill 18 (under the left rear open portion 104) during the work of loading and unloading the baggage B, this foot is outside the sensing range R of the ultrasonic sensor 76, and therefore the sliding door 20 remains open. Therefore, it is possible to restrict the worry of the sliding door 20 closing unintentionally during loading and unloading of the baggage B, and to carry out smooth loading and unloading of the baggage B.

Returning to FIG. 1, the vehicle ECU 32 is connected to an engine 40 serving as a power source of the vehicle 12 and to a power mode switch 44 capable of switching the power mode according to the authentication with the portable device 200 present within a prescribed range in the vehicle cabin 22. The power mode switch 44 substantially corresponds to a conventional ignition switch. The power source of the vehicle 12 may be a fuel cell instead of the engine 40.

Figure 4:
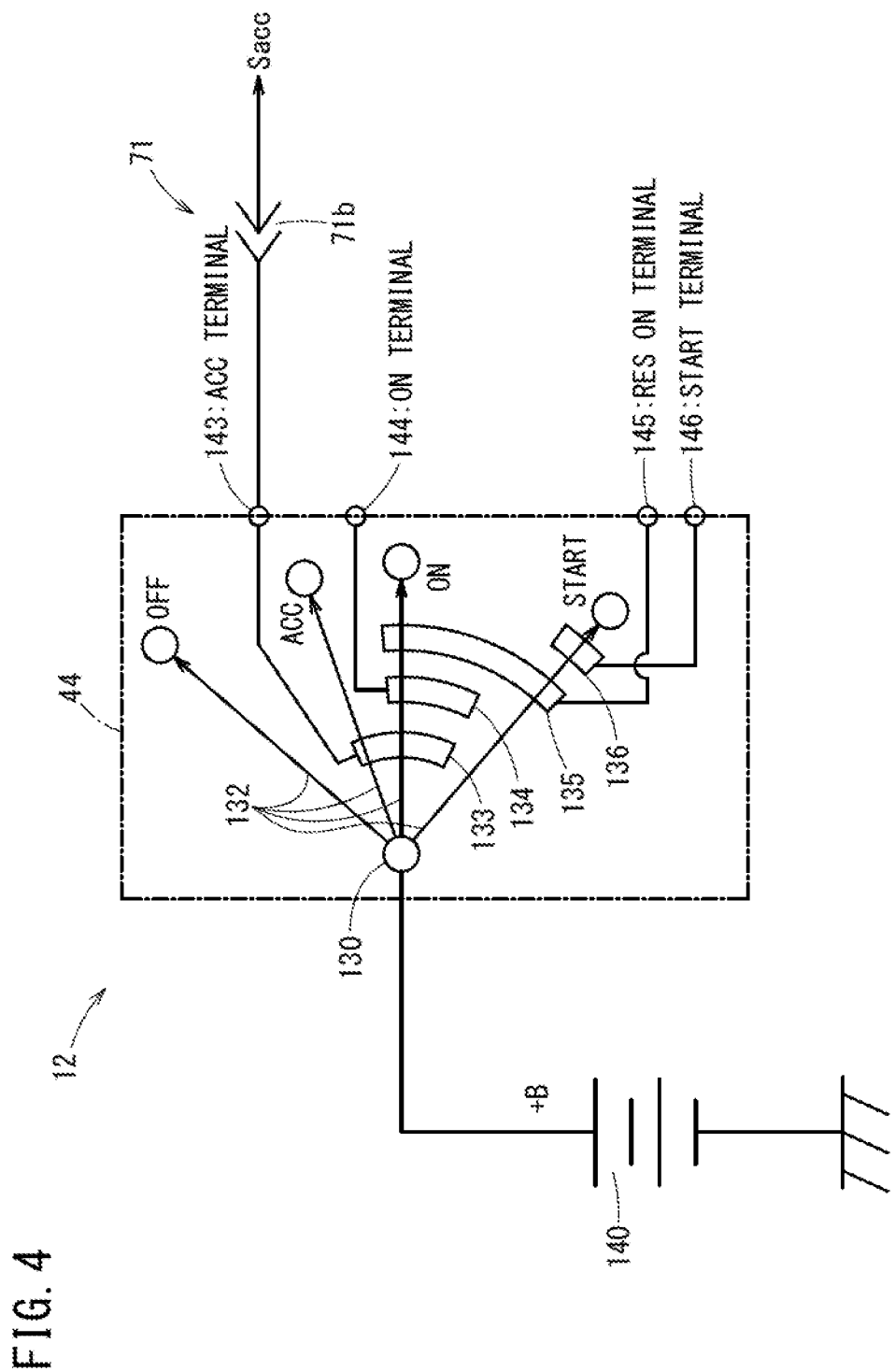
FIG. 4 is a descriptive diagram of a circuit configuration of a power mode switch.

FIG. 4 is a descriptive diagram of the circuit configuration of the power mode switch 44 (power mode switching button) arranged in an installment panel (not shown in the drawings). The actual circuit is formed by relays whose movable contact switching positions can be arbitrarily selected, but to facilitate understanding, the circuit is described using a circuit configuration of a rotary switch having the function of the conventional ignition switch.

The power mode switch 44 is a push-button switch capable of selecting (switching to) a functional mode by circulating, every time the button is pressed, among an OFF mode (in which all power supplies are OFF), an accessory mode (also referred to as an ACC mode in which it is possible to use on-board electrical equipment such as an audio system), an ON mode that is during operation after passing through a START mode in which the engine 40 is started, and the OFF mode, in the stated order.

The power mode switch 44 includes a common terminal 130, one movable contact 132, fixed contacts OFF, ACC, ON, and START, and segments 133, 134, 135, 136. An ACC terminal 143 is connected to the segment 133, an ON terminal 144 is connected to the segment 134, a RES (Remote Engine Start: relating to a so-called remote engine starter) ON terminal 145 is connected to the segment 135, and a START terminal 146 is connected to the segment 136.

When the movable contact 132 is at the fixed contact OFF, the voltage (also referred to +B power supply) of an on-board capacitor 140 is not connected to the electrical equipment and the like.

When the movable contact 132 is at the fixed contact ACC, the +B power supply is supplied to the ACC terminal 143 from the common terminal 130, via the movable contact 132 and the segment 133. In addition to the on-board electrical equipment (not shown in the drawings), a terminal 71*b* in the connector 71 of the sensing unit 50 is connected to the ACC terminal 143, via a wire. The signal of the voltage appearing in the ACC terminal 143 is referred to as an ACC signal Sacc. When the ACC terminal 143 is connected to the capacitor 140 through the segment 133, the movable contact 132, and the common terminal 130, the ACC signal Sacc becomes the voltage of the +B power supply (this voltage is also referred to as +B) with a nominal value+12 [V] (high level), and when the segment 133 is not connected to the movable contact 132, the ACC signal Sacc is grounded via a resistor (not shown in the drawings) to have a voltage of 0 [V] (low level).

When the movable contact 132 is at the fixed contact ON, the +B power supply is supplied to the ON terminal 144 via the segment 134, the +B power supply is also supplied to the ACC terminal 143 via the segment 133, and further, the +B power supply is also supplied to the RES ON terminal 145 via the segment 135. When the segments 134 and 135 are not connected to the movable contact 132, these segments 134 and 135 are grounded via a resistor (not shown in the drawings) through the ON terminal 144 and the RES ON terminal 145 to have a voltage of 0 [V].

When the movable contact 132 is at the fixed contact START, the +B power supply is supplied to the RES ON terminal 145 via the segment 135 and the +B power supply is supplied to the START terminal 146 via the segment 136. When the segment 136 is not connected to the movable contact 132, this segment 136 is grounded via a resistor (not shown in the drawings) through the START terminal 146 to have a voltage of 0 [V].

The following describes three points that it is important to be aware of.

First, when the power mode switch 44 is pressed in the vehicle cabin 22, the authentication communication with the portable device 200 inside the vehicle cabin 22 is successful, and the movable contact 132 is connected to the fixed contact START, the engine 40 starts by being cranked by a cranking motor (not shown in the drawings), after which the movable contact 132 is returned to the fixed contact ON by the vehicle ECU 32. During the operation after the engine 40 has started, the supply of power to the cranking motor is stopped.

Second, in a case where an engine start button of a remote controlled engine starter (not shown in the drawings) has been pressed from outside the vehicle 12, when the authentication of this remote controlled engine starter is successful, the vehicle ECU 32 performs control to connect the movable contact 132 directly to the fixed contact START from the position of the fixed contact OFF, while avoiding the fixed contact ACC and the fixed contact ON, to crank and start the engine 40, after which the movable contact 132 is kept at the fixed contact START. During the operation after the engine 40 has started, the supply of power to the cranking motor is stopped.

Third, in a case where the engine 40 is started from the outside by the remote controlled engine starter and enters the operational state, when the unlock button 204 of the portable device 200 is manipulated from outside, the authentication communication is successful, and the locks 122 and 222 are set to the unlocked state, for example, the vehicle ECU 32 connects the movable contact 132 to the fixed contact OFF from the fixed contact START, to stop the engine 40.

Returning to FIG. 1, a front door lock actuator 52 that engages and releases the lock (front door lock, FD lock) 122 of the front door 16, the door lock/unlock button 126, a front door lock switch 54 that senses the state (locked state or unlocked state) of the front door lock 122, a front door switch 56 that senses the open/closed state of the front door (FD) 16, and a sliding door lock actuator 60 that engages and releases the lock (SD lock) 222 of the sliding door 20 are connected to the door lock ECU 34.

When the door lock/unlock button 126 (see FIGS. 2A and 2B) that is incorporated in the door handle 124 is pressed, a door lock trigger signal St is output. The door lock trigger signal St functions as an unlock signal for the front door 16 and the sliding door 20 when the front door 16 and the sliding door 20 are in the locked state, and functions as a lock signal for the front door 16 and the sliding door 20 when the front door 16 and the sliding door 20 are closed and in the unlocked state.

The sliding door drive ECU 36 is connected to an outer door handle switch 58 that is set to a closed state and outputs an outer door handle switch ON signal So/hon when the outer door handle 154 (see FIGS. 2A and 2B) is pulled by a hand of the user M (and is set to an open state and does not output the outer door handle switch ON signal So/hon when the outer door handle 154 is not pulled), a sliding door lock switch 62 that senses a state (locked state or unlocked state) of the lock (SD lock) 222 of the sliding door 20, a sliding door switch 64 that senses the open/closed state of the sliding door 20, and a sliding door opening/closing actuator 66 that performs opening/closing driving of the sliding door (SD) 20.

The sensing ECU 70 includes a timer 26 serving as a clock device, and is connected to the ultrasonic sensor 76 formed by the transducer 72 and the transducer 74 described above, the buzzer 78, and the connector 71 serving as an electrical component that electrically connects wires to each other. The connector 71 includes nine terminals 71a to 71i.

The terminal 71a is a terminal through which the +B power supply is supplied to the sensing unit 50 from the capacitor 140 of the vehicle 12.

The terminal 71b is connected to the ACC terminal 143 (see FIG. 4), and is a terminal enabling the sensing ECU 70 to detect the voltage (+B power supply or 0 [V]) of the ACC terminal 143 according to the voltage level of the ACC signal Sacc and to transition the sensing unit 50 to a kick sensing mode state (kick sensing capable state) or a kick sensing prohibited mode state, based on the detected voltage.

The terminal 71c is connected to the front door switch 56, and is a terminal enabling the sensing ECU 70 to sense the open/closed state of the front door 16.

The terminal 71d is connected to the front door lock switch 54, and is a terminal enabling the sensing ECU 70 to sense the locked/unlocked state of the front door 16.

The terminal 71e is connected to the door lock/unlock button 126, is a terminal for outputting a pseudo door lock trigger signal Spt that is a signal equivalent to the door lock trigger signal St described above from the sensing ECU 70, and is connected to a generating section 160 for generating the pseudo door lock trigger signal Spt in the sensing ECU 70.

The terminal 71f is connected to the sliding door switch 64, and is a terminal enabling the sensing ECU 70 to sense the open/closed state of the sliding door 20.

The terminal 71g is connected to the sliding door lock switch 62, and is a terminal enabling the sensing ECU 70 to sense the locked/unlocked state of the lock 222 of the sliding door 20.

The terminals 71h and 71i have a function equivalent to that of the outer door handle switch 58 described above, and are connected to an outer door handle switch (ODH switch) 158 that is an electronic switch realized by a semiconductor element within the sensing ECU 70. The outer door handle switch 158 functions as a pseudo outer door handle switch ON signal Spo/hon generating section that is set to the ON state by the sensing ECU 70 under prescribed conditions described further below to generate and output a pseudo outer door handle switch ON signal (pseudo ODH switch ON signal) Spo/hon.

This pseudo outer door handle switch ON signal Spo/hon is a pseudo signal equivalent to the outer door handle switch ON signal So/hon that is output from the outer door handle switch 58 (see FIG. 1) when the outer door handle 154 (see FIGS. 2A and 2B) is pulled by the user M.

Operation

Figure 5:
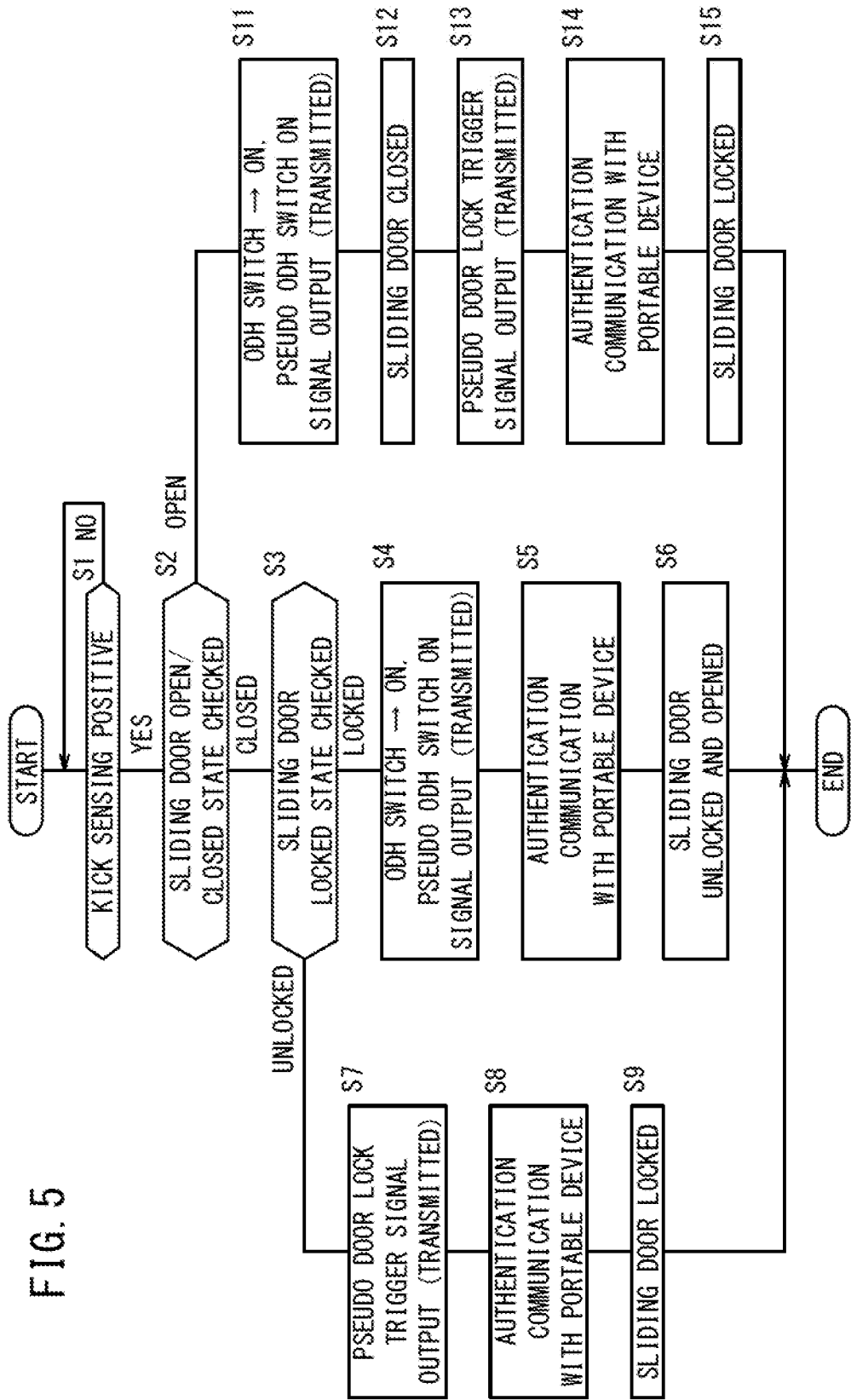
FIG. 5 is a flow chart provided to describe a detailed operation of the vehicle door opening/closing apparatus.

The following describes a detailed operation of the vehicle door opening/closing apparatus 10 that is basically configured and operates as described above, in the order of (1) to (4) shown below, while referencing a flow chart shown in FIG. 5 relating to the operation (opening/closing operation and locking/unlocking operation) of the sliding door 20 in which the vehicle door opening/closing apparatus body 302 and the sensing unit 50 are linked, a descriptive diagram shown in FIG. 6 of an operation from the time when the sliding door 20 (SD) is locked (LOCK) to the time when the sliding door 20 is unlocked (UNLOCK) and open (OPEN), a descriptive diagram shown in FIG. 7 of an operation from the time when the sliding door 20 is opened (OPEN) to the time when the sliding door 20 is closed (CLOSE) and from when the sliding door 20 is opened (OPEN) to when the sliding door 20 is closed (CLOSE) and locked (&LOCK), and a flow chart shown in FIG. 8 for determining operation or non-operation of the sensing unit 50.

(1) Transition process from the sliding door being closed and locked to being open and unlocked
(2) Transition process from the sliding door being closed and unlocked to being closed and locked
(3) Transition process from the sliding door being open and unlocked to being closed and locked (4) Process for determining operation or non-operation of the sensing unit 50

Operation of the Sliding Door 20 in Which the Vehicle Door Opening/Closing Apparatus Body 302 and the Sensing Unit 50 are Linked (1) Transition Process From the Sliding Door Being Closed and Locked to Being Open and Unlocked At step S1, the sensing ECU 70 judges whether kicking is sensed (the kicking motion is sensed).

Figure 6:
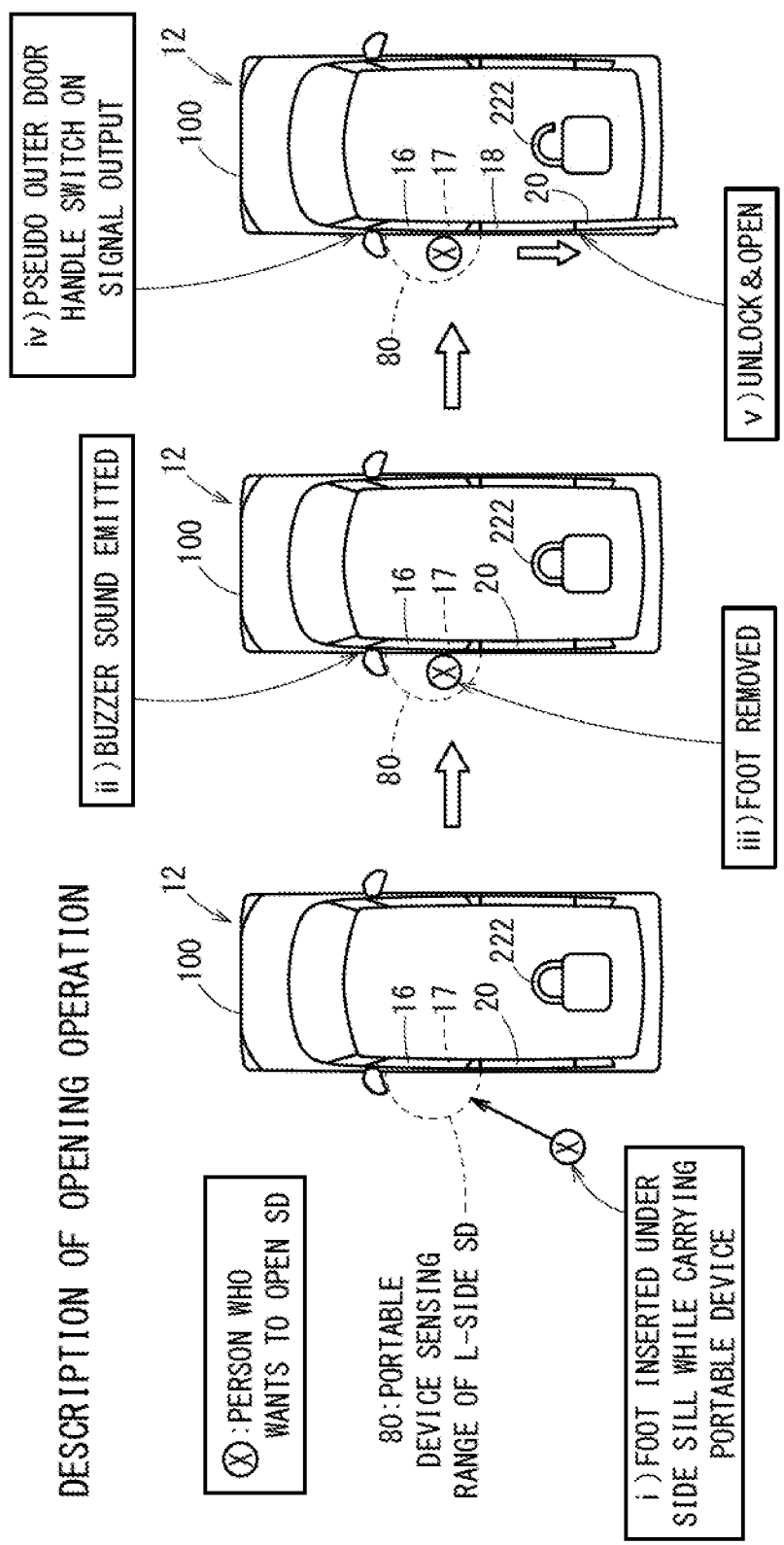
FIG. 6 is a descriptive diagram of an operation from the time when the sliding door is locked to the time when the sliding door is unlocked.

As shown in FIG. 6, this kicking is sensed when a person X, who is within the portable device sensing range 80 of the sliding door 20 (L-side SD) and wants to open the sliding door 20 (SD), i) inserts his or her foot (right foot or left foot F) below the ultrasonic sensor 76 that is under the front side sill 17 while holding the portable device 200, ii) the sensing unit 50 causes the buzzer 78 to emit a sound, and iii) person X withdraws his or her foot within several seconds (step S1: YES). In the present embodiment, it should be noted that the portable device sensing range 80 of the sliding door 20 is provided substantially near the front of the front door 16.

Next, at step S2, the sensing ECU 70 acquires the sensing result of the open/closed state of the sliding door switch 64 via the terminal 71f, and judges the open/closed state of the sliding door 20.

Here, the "closed state" is assumed (step S2: CLOSED).

Next, at step S3, the sensing ECU 70 senses the locked state of the sliding door 20 by acquiring, via the terminal 71g, the sensing result of the locked/unlocked state of the sliding door lock switch 62.

Here, the "locked state" is assumed (step S3: LOCKED).

At this time, at step S4, the sensing ECU 70 sets the outer door handle switch 158 to the ON state. Therefore, from the terminals 71h and 71i of the sensing ECU 70, which is connected to the outer door handle switch 158 of the sensing unit 50, iv) the pseudo outer door handle switch ON signal Spo/hon is output, and input to the sliding door drive ECU 36.

Next, at step S5, an authentication request from the sliding door drive ECU 36 triggered by the input of the pseudo outer door handle switch ON signal Spo/hon is transmitted to the authentication ECU 24 via the intra-vehicle communication line 30 (description of the intra-vehicle communication line 30 is omitted below), and the authentication ECU 24 that has received the pseudo outer door handle switch ON signal Spo/hon performs authentication communication with the portable device 200. In this case, the authentication is successful when the IDs stored in the storage devices 25 and 225 match each other, and a successful authentication result is provided from the authentication ECU 24 to the sliding door drive ECU 36.

At this time, at step S6, the sliding door drive ECU 36 v) sets the lock 222 to the unlocked state using the sliding door lock actuator 60 via the door lock ECU 34, and then drives the sliding door 20 to be in the open state using the sliding door opening/closing actuator 66 (drawing on the right side in FIG. 6).

The above process of {step S1: YES→step S2: CLOSED-→step S3: LOCKED→step S4: Spo/hon signal output→step S5: authentication communication→step S6: OPEN} is a process (referred to as a first route process) for switching the sliding door 20 in the closed and locked state to the open and unlocked state, according to the kicking action of the user X.

(2) Transition Process From the Sliding Door Being Closed and Unlocked to Being Closed and Locked On the other hand, at step S3 described above, if it is judged by the sensing ECU 70 that the currently closed sliding door 20 is in the "unlocked state", the sliding door 20 is not immediately opened by the first kick sensing of step S1.

Therefore, at step S7, the sensing ECU 70 outputs the pseudo door lock trigger signal Spt from the generating section 160 through the terminal 71e, to transmit this pseudo door lock trigger signal Spt to the door lock ECU 34.

Next, at step S8, with the input of the pseudo door lock trigger signal Spt as a trigger, the authentication request from the door lock ECU 34 is transmitted to the authentication ECU 24. At this time, the authentication ECU 24 performs the authentication communication with the portable device 200. The authentication is successful when the IDs stored in the storage devices 25 and 225 match each other, and a successful authentication result is provided from the authentication ECU 24 to the door lock ECU 34.

Next, at step S9, based on the successful authentication result, the door lock ECU 34 sets the lock 222 to the locked state, using the sliding door lock actuator 60.

The above process of {step S1: YES→step S2: CLOSED-→step S3: UNLOCKED→step S7: Spt signal output→step S8: authentication communication→step S9: LOCKED} is a process (referred to as a second route process) for switching the sliding door 20 in the closed and unlocked state to the locked state, according to the kicking action of the user X.

After the process of step S9, when the kicking action (second kicking action) is sensed again at step S1, the sliding door 20 transitions from the closed and locked state to the open and unlocked state, according to the first route process described above.

(3) Transition Process from the Sliding Door Being Open and Unlocked to Being Closed and Locked At step S1, the sensing ECU 70 judges whether kicking is sensed (the kicking motion is sensed).

Figure 7:
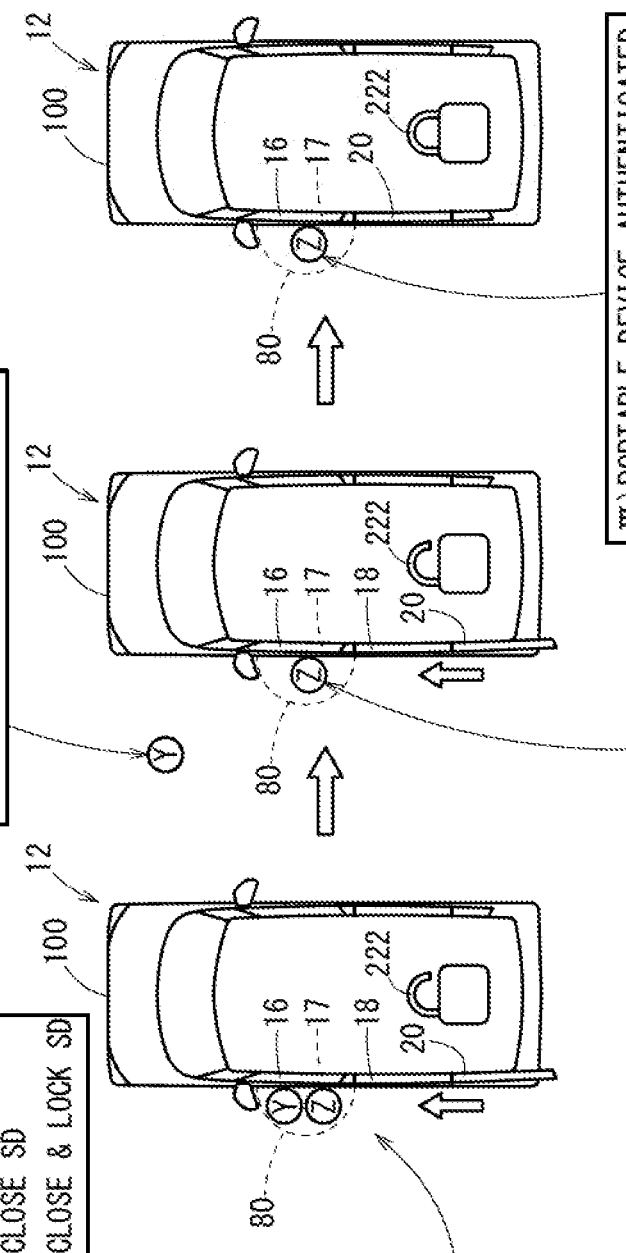
FIG. 7 is a descriptive diagram of an operation from the time when the sliding door is opened to the time when the sliding door is closed and from the time when the sliding door is opened to when the sliding door is closed and locked.

As shown in FIG. 7, this kick sensing judgment is affirmative when a person Y who is in the portable device sensing range 80 of the sliding door 20 (L-side SD) and wants to close the sliding door 20 (SD) (person who wants to CLOSE SD) or a person Z who is within the portable device sensing range 80 and wants to close and lock the sliding door 20 (SD) (person who wants to CLOSE AND LOCK SD) I) inserts and removes his or her foot (right foot or left foot F) below the ultrasonic sensor 76 that is under the front side sill 17 (performs the kicking motion) while holding the portable device 200 (step S1: YES). At this time, the sensing unit 50 causes the buzzer 78 to emit a sound.

In this case as well, when it is judged that the open/closed state of the sliding door 20 is the open state (and the lock 222 is obviously in the unlocked state) based on the sensing result of the open/closed state of the sliding door switch 64 by the sensing ECU 70 in step S2, the sensing ECU 70 sets the outer door handle switch 158 to the ON state at step S11. Therefore, I) the pseudo outer door handle switch ON signal Spo/hon is output from the outer door handle switch 158, and input to the sliding door drive ECU 36.

Next, at step S12, the sliding door drive ECU 36 drives the sliding door 20 to be in the closed state, using the sliding door opening/closing actuator 66.

The person Y who wants to close the sliding door 20 (SD) (person who wants to CLOSE SD) II) moves out of the portable device sensing range 80 while holding the portable device 200 before the sliding door 20 reaches the closed state.

On the other hand, the person Z who wants to close and lock the sliding door 20 II') waits within the portable device sensing range 80 while holding the portable device 200 until the sliding door 20 has reached the closed state (CLOSING COMPLETED).

When the sensing ECU 70 senses that the sliding door 20 has reached the closed state, based on the state of the sliding door switch 64, the sensing ECU 70 outputs the pseudo door lock trigger signal Spt from the generating section 160 and transmits this pseudo door lock trigger signal Spt to the door lock ECU 34 at step S13, in the same manner as in the processes of steps S7, S8, and S9 described above.

Next, at step S14, the authentication request of the door lock ECU 34 is transmitted to the authentication ECU 24, and the authentication ECU 24 performs the authentication communication with the portable device 200. The authentication is successful when the IDs stored in the storage devices 25 and 225 match each other, and a successful authentication result is provided from the authentication ECU 24 to the door lock ECU 34.

At this time, at step S15, the door lock ECU 34 sets the lock 222 to the locked state, using the sliding door lock actuator 60.

The above process of {step S1: YES→step S2: OPEN-→step S11: Spo/hon signal output→step S12: sliding door closed→step S13: Spt signal output→step S14: authentication communication→step S15: LOCKED} is a process (referred to as a third route process) for switching the sliding door 20 in the open and unlocked state to the closed and locked state, according to the kicking action of the user Z.

Even if the sensing unit 50 is a retrofit option, in the case of any of the first to third route processes described above, the sliding door 20 is opened/closed and locked/unlocked according to the established authentication communication (steps S5, S8, and S14) between the portable device 200 and the authentication ECU 24, and therefore the guarantee of security is maintained.

(4) Process for Determining Operation or Non-Operation of the Sensing Unit 50

Figure 8:
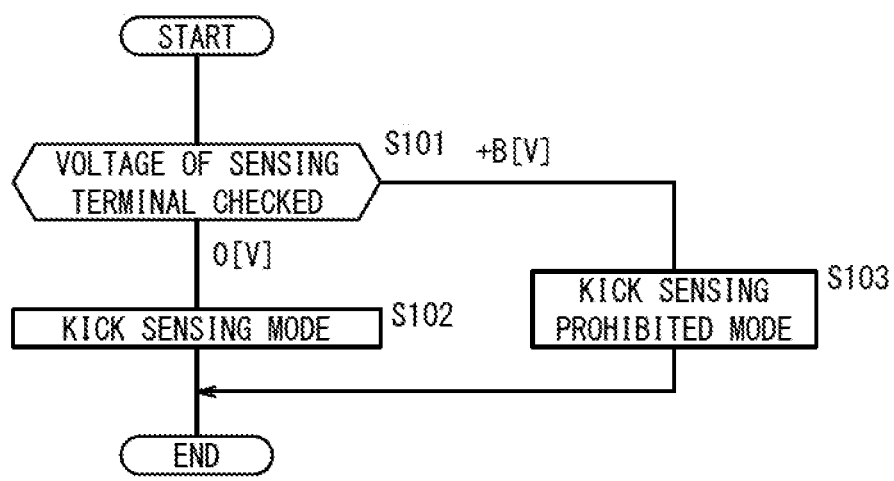
FIG. 8 is a flow chart provided to describe an operation of the sensing unit.

Next, at step S101 of FIG. 8, the sensing ECU 70 senses the ACC signal Sacc through the terminal 71*b* that is a terminal for sensing, and checks the voltage. If Sacc=+B, it is judged that the movable contact 132 of the power mode switch 44 is switched to the fixed contact ACC or the fixed contact ON in the vehicle 12, and assuming that there is a person in the vehicle 12, the kick sensing prohibited mode (kicking motion sensing disabled) is set at step S103.

On the other hand, if the ACC signal Sacc is 0 [V], the movable contact 132 is switched to the fixed contact OFF or the fixed contact START, and therefore assuming that no one is in the vehicle 12, the kick sensing mode (kicking motion sensing enabled) is set at step S102.

Summary and Modifications

The vehicle door opening/closing apparatus 10 according to the embodiment described above includes the portable device 200 that is capable of transmitting (transmitting by radio waves) a request signal to set the locks 122 and 222 of doors (front door 16 and sliding door 20) of the vehicle 12 to the locked state or unlocked state, from outside the vehicle 12; an authentication ECU (authentication unit) 24 on the vehicle 12 side that performs authentication communication with the portable device 200; the sensing unit 50 that is provided to the vehicle 12 and senses, in a non-contact manner, the presence of the user M located near the front door 16, in the embodiment described above; and a door driving unit (door lock ECU 34 and sliding door drive ECU 36) that is provided to the vehicle 12, drives the doors (front door 16 and sliding door 20) to be in the open state or the closed state, and drives the locks 122 and 222 to be in the locked state or the unlocked state based on the authentication communication between the authentication ECU 24 and the portable device 200.

Here, the door driving unit (door lock ECU 34 and sliding door drive ECU 36) drives the door (the sliding door 20 in the embodiment described above) to be in the locked state, based on the authentication communication between the authentication ECU 24 and the portable device 200, when the door (the sliding door 20 in the embodiment described above) is in the closed state and the unlocked state and the sensing unit 50 senses the presence of the user M due to the kicking action (kicking motion) of the foot (left foot F or right foot) of the user M, and drives the door (sliding door 20) to be in the open state (including fully open and partially open), based on the authentication communication between the authentication ECU 24 and the portable device 200, when the door (sliding door 20) is in the locked state and the sensing unit 50 senses the presence of the user M.

According to the embodiment described above, when the door (sliding door 20) is in the closed state and the unlocked state and the sensing unit 50 senses the presence of the user M, the door (sliding door 20) is driven to be in the locked state, based on the authentication communication between the authentication ECU 24 and the portable device 200, and therefore it is possible to lock the door (sliding door 20) when there is intent of wanting to lock the door (sliding door 20) and no intent to open the door (sliding door 20), thereby eliminating a feeling of discomfort.

When the door (sliding door 20) is in the locked state and the sensing unit 50 senses the presence of the user M, the door (sliding door 20) is driven to be in the open state, based on the authentication communication between the authentication ECU 24 and the portable device 200, and therefore it is possible to reliably set the door (sliding door 20) to the open state when there is intent to open the door (sliding door 20) that is in the locked state.

Furthermore, in the vehicle door opening/closing apparatus 10 according to the embodiment described above, the door driving unit (door lock ECU 34 and sliding door drive ECU 36) includes the outer door handle switch 58 that outputs the outer door handle switch ON signal So/hon when the outer door handle 154 is pulled by the user M; the sensing unit 50 includes the separate outer door handle switch 158 that outputs the pseudo outer door handle switch ON signal Spo/hon that is equivalent to the outer door handle switch ON signal So/hon output by the outer door handle switch 58; and when the door (rear sliding door 20) is in the locked state and the sensing unit 50 senses the presence of the user M, the door driving unit (door lock ECU 34 and sliding door drive ECU 36) drives the door (rear sliding door 20) to be in the open state based on the authentication communication between the authentication ECU 24 and the portable device 200, with the pseudo outer door handle switch ON signal Spo/hon as a trigger, the pseudo outer door handle switch ON signal Spo/hon being output from the separate outer door handle switch 158 of the sensing unit 50.

According to this embodiment, even if the sensing unit 50 is a so-called retrofit option, it is possible to link the existing door driving unit (door lock ECU 34 and sliding door drive ECU 36) with the portable device 200 and drive the door (sliding door 20) to be in the open state based on the authentication communication.

Furthermore, in the vehicle door opening/closing apparatus 10 of the embodiment described above, the door driving unit (door lock ECU 34 and sliding door drive ECU 36) includes the door lock/unlock button 126 that outputs the door lock trigger signal St when pressed by the user M; the sensing unit 50 includes the generating section 160 that generates and outputs the pseudo door lock trigger signal Spt that is equivalent to the door lock trigger signal St output by the door lock/unlock button 126; and when the door (rear sliding door 20) is in the open state, or in the closed state and the unlocked state and the sensing unit 50 senses the presence of the user M, the door driving unit (door lock ECU 34 and sliding door drive ECU 36) drives the door (rear sliding door 20) to be in the locked state based on the authentication communication between the authentication ECU 24 and the portable device 200, with the pseudo door lock trigger signal Spt as a trigger, the pseudo door lock trigger signal Spt being output from the generating section 160 of the sensing unit 50.

In the vehicle door opening/closing apparatus 10 according to the embodiment described above, even if the sensing unit 50 is a so-called retrofit option, it is possible to link the existing door driving unit (door lock ECU 34 and sliding door drive ECU 36) with the portable device 200 and drive the door (sliding door 20) to be in the locked state, based on the authentication communication.

In the vehicle door opening/closing apparatus 10 according to the embodiment described above, the door that is driven by the door driving unit (door lock ECU 34 and sliding door drive ECU 36) when the presence of the user M is sensed by the sensing unit 50 is the rear sliding door 20; the sensing unit 50 includes the ultrasonic sensor 76 that senses the foot (left foot F or right foot) of the user M; and the ultrasonic sensor 76 is arranged under the front side sill 17 of the front door 16.

According to the embodiment described above, while work such as loading and unloading items is being performed with the rear sliding door 20 in the open state, for example, it is possible to prevent the rear sliding door 20 from unexpectedly closing due to the movement of the foot (left foot F or right foot) of the user M who is doing this work.

The sensing unit 50 according to the embodiment described above is preferably used in the vehicle door opening/closing apparatus 10 described above.

The present invention is not limited to the above-described embodiments, but it goes without saying that various additional or alternative configurations could be adopted therein based on the content disclosed in the present Description.

The invention claimed is:

1. A vehicle door opening/closing apparatus comprising:
a portable device configured to transmit a request signal to set a door of a vehicle to a locked state or an unlocked state, from outside the vehicle;
an authentication unit provided on a side of the vehicle and configured to perform authentication communication with the portable device;
a door driving unit provided to the vehicle, and configured to drive the door to be in an open state or a closed state, and drive the door to be in the locked state or the unlocked state based on the authentication communication between the authentication unit and the portable device; and
a sensing unit provided to the vehicle as a retrofit option and configured to sense, in a non-contact manner, presence of a user located near the door,
wherein the door driving unit includes:
an outer door handle switch configured to output an outer door handle switch ON signal when the user pulls an outer door handle; and
a door lock/unlock button configured to output a door lock trigger signal when pressed by the user,
wherein the sensing unit includes:
a separate outer door handle switch configured to output a pseudo outer door handle switch ON signal that is equivalent to the outer door handle switch ON signal output by the outer door handle switch, when the presence of the user is sensed; and
a generating section configured to generate and output a pseudo door lock trigger signal that is equivalent to the door lock trigger signal output by the door lock/unlock button, when the presence of the user is sensed, and
wherein when the door is in the open state, or in the closed state and the unlocked state, the door driving unit drives the door to be in the closed state and the locked state based on the authentication communication between the authentication unit and the portable device, with the pseudo door lock trigger signal as a trigger, and
when the door is in the locked state, the door driving unit drives the door to be in the open state based on the authentication communication between the authentication unit and the portable device, with the pseudo outer door handle switch ON signal as a trigger.

2. The vehicle door opening/closing apparatus according to claim 1, wherein
the door is a rear sliding door,
the sensing unit includes an ultrasonic sensor configured to sense a foot of the user, and
the ultrasonic sensor is arranged under a side sill of a front door.

3. A sensing unit used in a vehicle door opening/closing apparatus, the vehicle door opening/closing apparatus comprising:
a portable device configured to transmit a request signal to set a door of a vehicle to a locked state or an unlocked state, from outside the vehicle;
an authentication unit provided on a side of the vehicle and configured to perform authentication communication with the portable device; and
a door driving unit provided to the vehicle, and configured to drive the door to be in an open state or a closed state, and drive the door to be in the locked state or the unlocked state based on the authentication communication between the authentication unit and the portable device,
the sensing unit being provided to the vehicle as a retrofit option and configured to sense, in a non-contact manner, presence of a user located near the door,
wherein the door driving unit includes:
an outer door handle switch configured to output an outer door handle switch ON signal when the user pulls an outer door handle; and
a door lock/unlock button configured to output a door lock trigger signal when pressed by the user,
wherein the sensing unit includes:
a separate outer door handle switch configured to output a pseudo outer door handle switch ON signal that is equivalent to the outer door handle switch ON signal output by the outer door handle switch, when the presence of the user is sensed; and a generating section configured to generate and output a pseudo door lock trigger signal that is equivalent to the door lock trigger signal output by the door lock/unlock button, when the presence of the user is sensed, and wherein when the door is in the open state, or in the closed state and the unlocked state, the door driving unit drives the door to be in the closed state and the locked state based on the authentication communication between the authentication unit and the portable device, with the pseudo door lock trigger signal as a trigger, and when the door is in the locked state, the door driving unit drives the door to be in the open state based on the authentication communication between the authentication unit and the portable device, with the pseudo outer door handle switch ON signal as a trigger.

* * * * *